United States Patent
Tatsumi et al.

(10) Patent No.: US 7,326,401 B2
(45) Date of Patent: Feb. 5, 2008

(54) MWW TYPE ZEOLITE SUBSTANCE, PRECURSOR SUBSTANCE THEREFOR, AND PROCESS FOR PRODUCING THESE SUBSTANCES

(75) Inventors: Takashi Tatsumi, Kawasaki (JP); Peng Wu, Yokohama (JP); Katsuyuki Tsuji, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 509 days.

(21) Appl. No.: 10/506,532

(22) PCT Filed: Feb. 26, 2003

(86) PCT No.: PCT/JP03/02155

§ 371 (c)(1),
(2), (4) Date: Sep. 3, 2004

(87) PCT Pub. No.: WO03/074422

PCT Pub. Date: Sep. 12, 2003

(65) Prior Publication Data

US 2005/0158238 A1  Jul. 21, 2005

Related U.S. Application Data

(60) Provisional application No. 60/363,313, filed on Mar. 12, 2002.

(30) Foreign Application Priority Data

Mar. 7, 2002 (JP) ............... 2002-061542
Feb. 3, 2003 (JP) ............... 2003-026529

(51) Int. Cl.
*C01B 39/04* (2006.01)
*C01B 39/06* (2006.01)
*B01J 29/06* (2006.01)

(52) U.S. Cl. ............ 423/713; 423/702; 423/705; 423/706; 423/714; 502/60; 502/85

(58) Field of Classification Search ............ 423/713, 423/705, 706, 702, 714; 502/60, 85
See application file for complete search history.

(56) References Cited

U.S. PATENT DOCUMENTS 4,954,325 A * 9/1990 Rubin et al. ............ 423/706

(Continued)

FOREIGN PATENT DOCUMENTS

| DE | 199 39 416 A | 2/2001 |
| WO | WO 02 28774 A | 4/2002 |
| WO | WO 02 051751 A | 7/2002 |

OTHER PUBLICATIONS

Peng Wu et al: "A Novel Titanosilicate with MWW Structure. I. Hydrothermal Synthesis, Elimination of Extraframework Titanium, and Characterizations" Journal of Physical Chemistry. B, Materials, Surfaces, Interfaces and Biophysical, Washington, DC, US, vol. 105, No. 15, Apr. 15, 2001, pp. 2897-2905, XP002204295, ISSN: 1089-5647.

(Continued)

*Primary Examiner*—David M Brunsman
(74) *Attorney, Agent, or Firm*—Sughrue Mion, PLLC

(57) ABSTRACT

A process for easily synthesizing a zeolite substance containing an element having a large ionic radius in the framework at a high ratio. This process comprises the following first to fourth steps:

First Step:
a step of heating a mixture containing a template compound, a compound containing a Group 13 element of the periodic table, a silicon-containing compound and water to obtain a precursor (A);

Second Step:
a step of acid-treating the precursor (A) obtained in the first step;

Third Step:
a step of heating the acid-treated precursor (A) obtained in the second step together with a mixture containing a template compound and water to obtain a precursor (B); and Fourth Step:
a step of calcining the precursor (B) obtained in the third step to obtain a zeolite substance.

25 Claims, 5 Drawing Sheets

U.S. PATENT DOCUMENTS

| | | | |
|---|---|---|---|
| 5,284,643 A | * | 2/1994 | Morrison et al. ........... 423/705 |
| 5,877,352 A | * | 3/1999 | Eller et al. ................. 564/485 |
| 6,077,498 A | * | 6/2000 | Diaz Cabanas et al. .... 423/702 |
| 6,114,551 A | | 9/2000 | Levin et al. |

OTHER PUBLICATIONS

Peng Wu et al: "Hydrothermal synthesis of a novel titanosilicate with MWW topology" Chemistry Letters, Chemical Society of Japan. Tokyo, JP, No. 7, Jul. 5, 2000, pp. 774-775, XP002204294 ISSN: 0366-7022.

D. Nuntasri, et al: "Highly active delaminated Ti-MWW for epoxidation of bulky cycloalkenes with hydrogen peroxide" Chemistry Letters, vol. 32, No. 4, Apr. 2003, pp. 326-327, XP009014037.

* cited by examiner

MWW TYPE ZEOLITE SUBSTANCE, PRECURSOR SUBSTANCE THEREFOR, AND PROCESS FOR PRODUCING THESE SUBSTANCES

This application is a 371 of PCT/JP03/02155, filed 26 Feb. 2003.

This Application claims the priority of an application based on U.S. Application Ser. No. 60/363,313 (filed on Mar. 12, 2002).

TECHNICAL FIELD

The present invention relates to zeolite substance having a structure code MWW, a precursor therefor having a layered structure, and processes for producing these substances.

More specifically, the present invention relates to a zeolite substance having a structure code MWW to be produced by utilizing a post-synthesis method, a precursor for the zeolite substance having a layered structure, and a process for producing these substances.

BACKGROUND ART

Generally, "zeolite" has been long a generic term of crystalline porous aluminosilicates and these are $(SiO_4)^{4-}$ and $(AlO_4)^{5-}$ having a tetrahedral structures as the basic units of the structure. However, in recent years, it has been clarified that a structure peculiar or analogous to zeolite is present in many other oxides such as aluminophosphate.

International Zeolite Association (hereinafter simply referred to as "IZA") organizes the frameworks of zeolite and zeolite-like materials in *Atlas of Zeolite Structure Types*, 5th edition, edited by Ch. Baerlocher, W. M. Meier and D. H. Olson, Elsevier, 2001 (Non-Patent Document 1) (hereinafter simply referred to as "Atlas") and each framework is denoted by an IZA code composed of three alphabetical letters.

With respect to the details of the history thereof, "*Zeolite no Kagaku to Kogaku (Science and Engineering of Zeolite)*" by Yoshio Ono and Tateaki Yajima (compilers), Kodansha K. K., published on Jul. 10, 2000 (Non-Patent Document 2) may be referred to.

The definition of "zeolite" as used in the present invention is based on the definition described in *Zeolite no Kagaku to Kogaku (Science and Engineering of Zeolite)* that zeolite includes not only aluminosilicate but also those having an analogous structure, such as metallosilicate.

In the present invention, a structure code composed of three alphabetical capital letters derived from the names of standard substances initially used for the clarification of structure, approved by IZA, is used for the structure of zeolite. This includes those recorded in Atlas and those approved in the 5th and later editions.

Further, unless otherwise indicated specifically, the "aluminosilicate" and "metallosilicate" as used in the present invention are not limited at all on the difference such as crystalline/non-crystalline or porous/non-porous and include "aluminosilicates" and "metallosilicates" in all properties.

The "molecular sieve" as used in the present invention is a substance having an activity, operation or function of sieving molecules by the size and includes zeolite. This is described in detail in "Molecular Sieve" of *Hyojun Kagaku Yogo Jiten (Glossary for Standard Chemistry)*, compiled by Nippon Kagaku Kai, published by Maruzen on Mar. 30, 1991 (Non-Patent Document 3).

Zeolite and zeolite-like materials have various frameworks and the framework approved by IZA includes 133 species until the issue of Atlas, 5th edition. Even at present, new frameworks are being discovered and the frameworks approved by IZA are introduced on the homepage thereof.

However, the frameworks reported all are not always useful in industry and industrially useful frameworks are relatively limited. It is considered that the industrial value is generally determined by the uniqueness of structure, the production cost and the like. Among frameworks discovered in recent years, MWW structure is particularly useful in industry and attracting an attention. The MWW structure is a framework peculiar to zeolite represented by MCM-22.

According to *Zeolite no Kagaku to Koqyo (Science and Engineering of Zeolite)*, a patent application for a synthesis method of MCM-22 was filed by Mobil in 1990 (JP-A (unexamined published Japanese patent application) 63-297210 (Patent Document 1)) and thereafter, Leonowicz et al. reported that MCM-22 is a hexagonal zeolite having a particular pore structure. A representative substance thereof is borosilicate having the following unit cell composition:

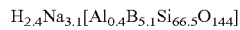

$H_{2.4}Na_{3.1}[Al_{0.4}B_{5.1}Si_{66.5}O_{144}]$

The characteristic feature in the framework is to have two pore networks independent of each other in the direction perpendicular to the c axis (in the plane direction of layer). One of these pore networks is present between layers and a cocoon-like supercage (0.71×0.71×1.82 nm) is two-dimensionally connected to six supercages therearound. The supercages are directly connected to each other by a 10-membered ring and therefore, a relatively large molecule can enter into the pore as compared with a tunnel-like 10-membered ring pore. Another of the above pore networks is present within a layer and a two-dimensional network is formed by 10-membered ring zigzagged pores. ITQ-1 which is pure silica, SSZ-25 and the like have the same framework.

As for the production process for MWW-type zeolite, there is a process utilizing a hydrothermal synthesis at around 150° C. using a relatively inexpensive hexamethyleneimine as the crystallizing agent. Aluminosilicate can be synthesized at an Si/Al molar ratio of 15 to 35. Substances obtained by the hydrothermal synthesis and showing a production behavior different from zeolite are generally a layered precursor (commonly called MCM-22(P)) and are characterized in that when calcined, dehydration condensation takes place between layers and MCM-22 having a zeolitic 3-dimensional structure is formed.

However, in recent studies, it has been reported that MCM-49 produced by the same preparation method while charging a large amount of an alkali metal has the same framework as MCM-22. This reveals that not a layered precursor but aluminosilicate having an MWW structure can be directly obtained as a product of the hydrothermal synthesis (see, S. L. Lawton et al., *J. Phys. Chem.*, 100, 3788 (1996) (Non-Patent Document 4)).

The MWW structure has a characteristic feature not seen in conventional zeolites as described above, and aluminosilicate having the MWW structure is known to exhibit high activity and selectivity in the synthesis of ethylbenzene or cumene as compared with zeolite having other structures or catalysts other than zeolite and it is considered that such zeolites have already been used in many plants over the world.

Also, there is an attempt to obtain a catalyst having higher performance by utilizing the layered precursor obtained in the synthesis of MWW structure. More specifically, MCM-36 obtained by crosslinking the layered precursor with silica (see, for example, W. J. Roth et al., *Stud. Surf. Sci. Catal.*, 94, 301 (1995) (Non-Patent Document 5)), thin-layered substance ITQ-2 obtained by exfoliation of layers (see, for example, A. Corma et al., *Microporous Mesoporous Mater.*, 38, 301 (2000) (Non-Patent Document 6)) and the like have been reported and it is stated that these exhibit higher activity than aluminosilicate having a mere MWW structure.

However, even in the above-mentioned high-performance catalysts, the reactivity thereof is basically derived from the layered structure constituting the MWW structure and when compared with zeolites having other frameworks, these are classified into substances analogous to zeolite having an MWW structure. The synthesis of such a zeolite-like layered compound is characterized by having a step of treating the layered precursor MCM-22(P) in an aqueous solution containing a surfactant such as hexadecyltrimethylammonium bromide, and thereby swelling or exfoliating a layer.

On the other hand, since the MWW structure has a characteristic feature not seen in other zeolite structures as described above, a characteristic catalytic activity or adsorbing activity attributable to the MWW framework structure can be expected. This characteristic activity is not necessarily limited to the above-described aluminosilicate but metallosilicate containing an element other than aluminum in the framework (or skeleton) is also expected to provide the same effect. From this expectation, various studies have been made on the synthesis of metallosilicate having an MWW structure. However, the transition element represented by titanium, vanadium and chromium, and the typical element of the 5th period or more represented by indium and tin, which are expected to show remarkably different properties from aluminosilicate in general (not limited to MWW structure), have a very large ionic radius as compared with silicon or aluminum and therefore, such an element is usually difficult to introduce into the framework. By the simple direct synthesis method of allowing a compound containing such an element to be present together in the raw material for synthesizing zeolite, a desired metallosilicate cannot be obtained in many cases.

For introducing the element into the framework, various methods have been proposed. Representative examples of the method employed for the MWW structure include a post-synthesis method (a method of once synthesizing zeolite and after-treating it to introduce a heteroelement into the framework; this is generally called a post-synthesis in contract with the direct synthesis) and an improved direct method.

With respect to the post-synthesis method, for example, U.S. Pat. No. 6,114,551 (Patent Document 2) discloses a process for synthesizing metallosilicate by a post-synthesis method, where aluminosilicate having an MWW structure is once synthesized, the whole or a part of aluminum is removed out from the aluminosilicate by a dealuminating treatment such as contact with $SiCl_4$ in gas phase to form defects, and a compound containing an element to be introduced, such as $TiCl_4$, is contacted with the dealuminated product.

As for the improved direct method, Wu et al. have reported an example where ferrisilicate is obtained by designing the step of adding an iron compound to a gel (P. Wu et al., *Chem. Commun.*, 663 (1997) (Non-Patent Document 7)).

Further, for Ti which is difficult to introduce into the frame, a synthesis method using boron as a structure supporting agent has been recently developed (P. Wu et al., *Chemistry Letters*, 774 (2000) (Non-Patent Document 8)).

Also, a method for obtaining MWW-type titanosilicate has been proposed, where a large amount of boron is added to a starting raw material, an MWW precursor MCM-22(P) having both boron and titanium in the framework is synthesized by utilizing the function of boron as a structure supporting agent and after removing boron, if desired, by an acid treatment, the obtained precursor is calcined. The titanosilicate having an MWW structure prepared by this method is reported to exert a characteristic catalytic activity (P. Wu et al., *J. Phys. Chem. B*, 105, 2897 (2001) (Non-Patent Document 9)).

However, according to these methods, particularly the post-synthesis method wherein a zeolite is caused to contact a compound of an element to be introduced thereinto, most part of the elements intended to introduce cannot be introduced into the framework and remain as a residue in the pore. In order to improve the introduction efficiency, one important point is to select a compound which can easily enter into pores of zeolite. However, there is a problem that in general a compound containing an element intended to introduce and having a sufficiently small molecular size is not available on the market.

Further, on use as a catalyst or the like, in the case where the raw material is a dealuminated product of MWW-type aluminosilicate as in U.S. Pat. No. 6,114,551, a side reaction ascribable to aluminum remaining in the framework sometimes brings about a serious problem such as causing side reactions to provide by-products. The same problem occurs in the direct method using boron as a structure supporting agent, that is, boron cannot be satisfactorily removed even by an acid treatment and a large amount of boron remains in the framework or pores, or if strict conditions are adapted for the process of removing boron by an acid treatment or the like so as to enhance the removal ratio of boron, components which must remain in the frame are also disadvantageously removed at the same time. Moreover, the proper synthesis conditions greatly change depending on the element intended to introduce and the compound containing the element and therefore, these methods are not very good in terms of the general-purpose applicability.

(Patent Document 1)

JP-A 63-297210

(Patent Document 2)

U.S. Pat. No. 6,114,551

(Non-Patent Document 1)

*Atlas of Zeolite Structure Types*, 5th edition, edited by Ch. Baerlocher, W. M. Meier and D. H. Olson, Elsevier, 2001

(Non-Patent Document 2)

"Zeolite no Kagaku to Kogaku (Science and Engineering of Zeolite" by Yoshio Ono and Tateaki Yajima (compilers), Kodansha K. K., published on Jul. 10, 2000

(Non-Patent Document 3)

"Molecular Sieve" of Hyojun Kagaku Yogo Jiten (Glossary for Standard Chemistry), compiled by Nippon Kagaku Kai, published by Maruzen on Mar. 30, 1991.

(Non-Patent Document 4)

S. L. Lawton et al., J. Phys. Chem., 100, 3788 (1996)

(Non-Patent Document 5)

W. J. Roth et al., Stud. Surf. Sci. Catal., 94, 301 (1995)

(Non-Patent Document 6)

A. Corma et al., Microporous Mesoporous Mater., 38, 301 (2000)

(Non-Patent Document 7)
P. Wu et al., Chem. Commun., 663 (1997)
(Non-Patent Document 8)
P. Wu et al., Chemistry Letters, 774 (2000)
(Non-Patent Document 9)
P. Wu et al., *J. Phys. Chem. B*, 105, 2897 (2001)

DISCLOSURE OF INVENTION

An object of the present invention is to provide a process for easily synthesizing zeolite having an MWW structure, particularly, zeolite containing an element having a large ionic radius, which is difficult to introduce by conventional synthesis methods, in the framework at a high ratio.

As a result of earnest study, the present inventors have found that zeolite having a structure of IZA structure code MWW and containing an element having a large ionic radius in the frame at a high ratio can be simply and easily synthesized by a specific production process. The present invention has been accomplished based on this finding.

That is, the present invention (I) is a process for producing a zeolite substance having an MWW structure, comprising the following first to fourth steps:

First Step:
a step of heating a mixture containing a template compound, a compound containing a Group 13 element of the periodic table, a silicon-containing compound and water to obtain a precursor (A);

Second Step:
a step of acid-treating the precursor (A) obtained in the first step;

Third Step:
a step of heating the acid-treated precursor (A) obtained in the second step together with a mixture containing a template compound and water to obtain a precursor (B); and Fourth Step:
a step of calcining the precursor (B) obtained in the third step to obtain a zeolite substance.

The present invention (II) is a zeolite substance which contains at least one element selected from the elements belonging to Groups 3 to 14, in the Period 4 or more of the periodic table; and can be synthesized by the production process of a zeolite substance having an MWW-type structure of the present invention (I).

The present invention comprises, for example, the following matters.

[1] A process for producing a zeolite substance having an MWW structure, comprising the following first to fourth steps:

First Step:
a step of heating a mixture containing a template compound, a compound containing a Group 13 element of the periodic table, a silicon-containing compound and water to obtain a precursor (A);

Second Step:
a step of acid-treating the precursor (A) obtained in the first step;

Third Step:
a step of heating the acid-treated precursor (A) obtained in the second step together with a mixture containing a template compound and water to obtain a precursor (B); and Fourth Step:
a step of calcining the precursor (B) obtained in the third step to obtain a zeolite substance.

[2] The process for producing a zeolite substance according to [1], wherein the compound containing a Group 13 element of the periodic table used in the first step is a boron-containing compound.

[3] The process for producing a zeolite substance according to [1] or [2], wherein the following first-2 step is performed between the first step and the second step, and the substance obtained in the first-2 step is used instead of the precursor (A) in the second step:

First-2 Step:
a step of calcining a part or entirety of the precursor (A) obtained in the first step.

[4] The process for producing a zeolite substance according to any one of [1] to [3], wherein the following third-2 step is performed between the third step and the fourth step, and the substance obtained in the third-2 step is used instead of as the precursor (B) in the fourth step:

Third-2 Step:
a step of acid-treating a part or entirety of the precursor (B) obtained in the third step.

[5] The process for producing a zeolite substance according to any one of [1] to [4], wherein in the third step, a compound containing at least one element selected from the elements belonging to Groups 3 to 14 of the periodic table is present together with the acid-treated precursor (A) obtained in the second step.

[6] The process for producing a zeolite substance according to any one of [1] to [5], wherein the template compound is a nitrogen-containing compound.

[7] The process for producing a zeolite substance according to [6], wherein the nitrogen-containing compound is an amine and/or quaternary ammonium compound.

[8] The process for producing a zeolite substance according to [6], wherein the nitrogen-containing compound is at least one member selected from the group consisting of piperidine, hexamethyleneimine and a mixture of piperidine and hexamethyleneimine.

[9] The process for producing a zeolite substance according to any one of [2] to [8], wherein the boron-containing compound is at least one member selected from the group consisting of boric acid, borate, boron oxide, boron halide and trialkylborons.

[10] The process for producing a zeolite substance according to any one of [1] to [9], wherein the silicon-containing compound is at least one member selected from the group consisting of silicic acid, silicate, silicon oxide, silicon halide, fumed silicas, tetraalkyl ortho-silicate and colloidal silica.

[11] The process for producing a zeolite substance according to any one of [2] to [10], wherein the ratio between boron and silicon in the mixture of the first step is boron:silicon=0.01 to 10:1 in terms of the molar ratio.

[12] The process for producing a zeolite substance according to any one of [2] to [11], wherein the ratio between boron and silicon in the mixture of the first step is boron:silicon=0.05 to 5:1 in terms of the molar ratio.

[13] The process for producing a zeolite substance according to any one of [1] to [12], wherein the ratio between water and silicon in the mixture of the first step is water:silicon=5 to 200:1 in terms of the molar ratio.

[14] The process for producing a zeolite substance according to any one of [1] to [13], wherein the ratio between the template compound and silicon in the mixture of the first step is template compound:silicon=0.1 to 5:1 in terms of the molar ratio.

[15] The process for producing a zeolite substance according to any one of [1] to [14], wherein the heating temperature in the first step is from 110 to 200° C.

[16] The process for producing a zeolite substance according to any one of [1] to [15], wherein the acid used for the acid-treated in the second step is a nitric acid.

[17] The process for producing a zeolite substance according to any one of [1] to [16], wherein the heating temperature in the third step is from 110 to 200° C.

[18] The process for producing a zeolite substance according to any one of [1] to [17], wherein the calcining temperature in the fourth step is from 200 to 700° C.

[19] The process for producing a zeolite substance according to any one of [3] to [18], wherein the calcining temperature in the first-2 step is from 200 to 700° C.

[20] The process for producing a zeolite substance according to any one of [1] to [19], wherein in the third step, the acid-treated precursor (A) obtained in the second step and the mixture containing a template compound and water are previously mixed and then heated.

[21] The process for producing a zeolite substance according to any one of [1] to [20], wherein a dry gel method of charging the acid-treaded precursor (A) obtained in the second step and the mixture containing a template compound and water while isolating the precursor (A) and the mixture from each other, and contacting the vapor of the mixture containing a template compound and water with a mixture of a compound containing at least one element selected from Group 3 to Group 14 elements of the periodic table, and the precursor (A), in the third step.

[22] A precursor obtained in the third step of the process according to any one of [1]-[21].

[23] The precursor according to 22 which has a layered structure.

[24] The process for producing a zeolite substance according to any one of [5] to [21], wherein the at least one element selected from the elements belonging to Groups 3 to 14 of the periodic table is at least one element selected from the group consisting of titanium, zirconium, vanadium, niobium, tantalum, chromium, molybdenum, tungsten, manganese, iron, cobalt, nickel, zinc, gallium, indium, tin and lead.

[25] A metallosilicate substance having an MWW structure containing at least one element selected from the elements belonging to Groups 3 to 14, in the Period 4 or more of the periodic table.

[26] A metallosilicate substance having an MWW structure containing at least one element selected from the elements belonging to Groups 3 to 14, in the Period 5 or more of the periodic table.

[27] A metallosilicate substance having an MWW structure containing at least one element selected from the group consisting of titanium, zirconium, vanadium, niobium, tantalum, chromium, molybdenum, tungsten, manganese, iron, cobalt, nickel, zinc, gallium, indium, tin and lead.

[28] A metallosilicate substance for a zeolite substance having an MWW structure produced by the process according to any one of [1]-[21] and [24].

[29] A layered precursor metallosilicate substance for a zeolite substance having an MWW structure containing at least one element selected from the elements belonging to Groups 3 to 14, in the Period 4 or more of the periodic table.

[30] A layered precursor metallosilicate substance for a zeolite substance having an MWW structure containing at least one element selected from the elements belonging to Groups 3 to 14, in the Period 5 or more of the periodic table.

[31] A layered precursor metallosilicate substance for a zeolite substance having an MWW structure containing at least one element selected from the group consisting of titanium, zirconium, vanadium, niobium, tantalum, chromium, molybdenum, tungsten, manganese, iron, cobalt, nickel, zinc, gallium, indium, tin and lead.

[32] A layered precursor metallosilicate substance for a zeolite substance having an MWW structure produced by the process according to any one of [1]-[21] and [24].

[33] A zeolite substance produced by the process according to any one of [1]-[21] and [24].

[34] A process for producing a layered precursor for a zeolite substance, comprising the following first to third steps:

First Step:
  a step of heating a mixture containing a template compound, a compound containing a Group 13 element of the periodic table, a silicon-containing compound and water to obtain a precursor (A);

Second Step:
  a step of acid-treating the precursor (A) obtained in the first step;

Third Step:
  a step of heating the acid-treated precursor (A) obtained in the second step together with a mixture containing a template compound and water to obtain a layered precursor.

[35] A layered precursor for a zeolite substance, produced by the process according to [34].

BEST MODE FOR CARRYING OUT THE INVENTION

Hereinbelow, the present invention will be described in detail with reference to the accompanying drawings as desired. In the following description, "%" and "part(s)" representing a quantitative proportion or ratio are those based on mass (or weight), unless otherwise noted specifically.

(Process for Producing Zeolite Substance)

First, the present invention (I) is described. The present invention (I) is a process for producing a zeolite substance having an MWW-type structure, comprising the following first to fourth steps:

First Step:

a step of heating a mixture containing a template compound, a compound containing a Group 13 element of the periodic table, a silicon-containing compound and water to obtain a precursor (A);

Second Step:

a step of acid-treating the precursor (A) obtained in the first step;

Third Step:

a step of heating the acid-treated precursor (A) obtained in the second step together with a mixture containing a template compound and water to obtain a precursor (B); and Fourth Step:

a step of calcining the precursor (B) obtained in the third step to obtain a zeolite substance.

Figure 1:
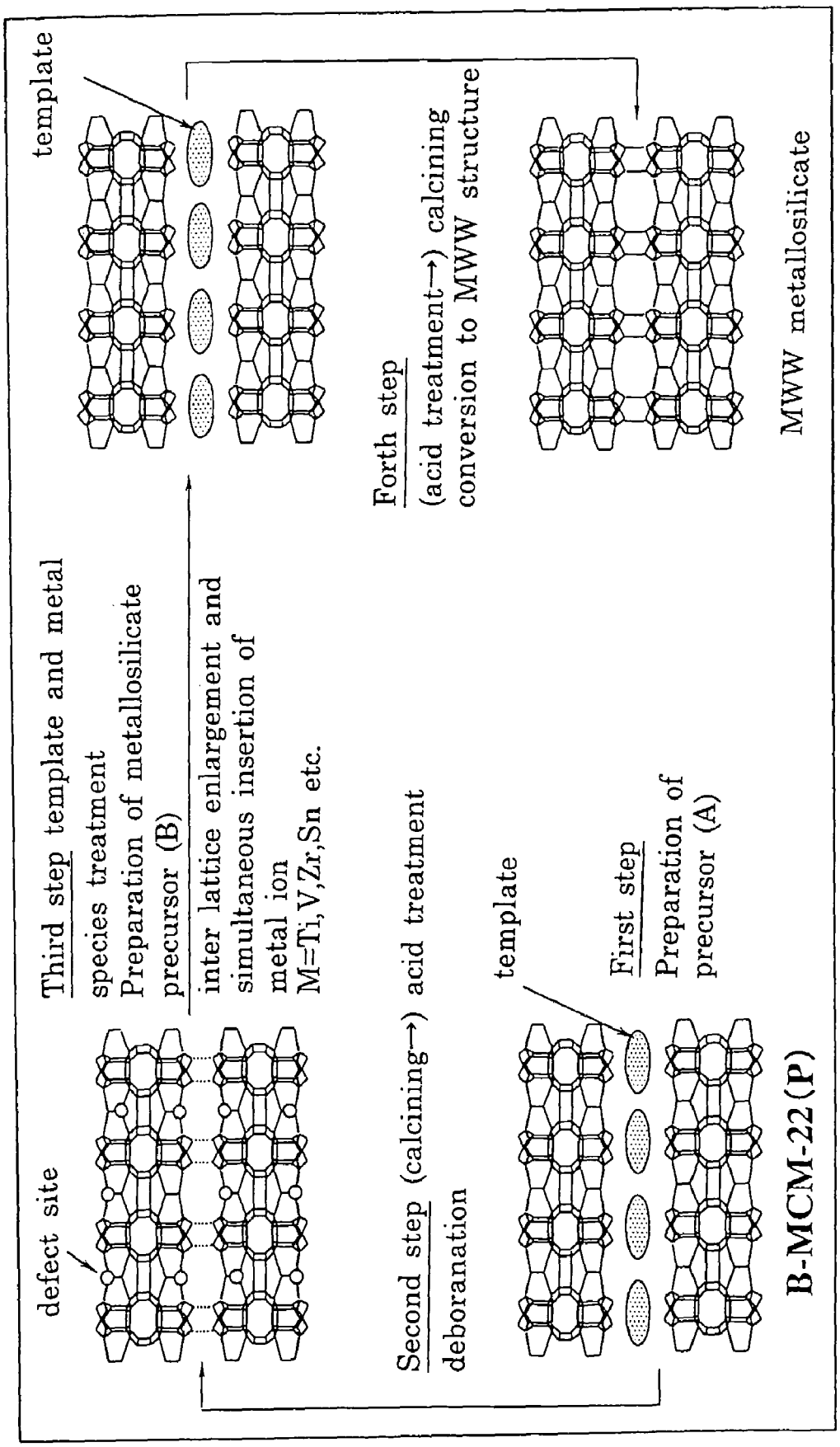
FIG. 1 is schematic view for explaining the typical synthesis method for an MWW type zeolite substance according to the present invention.

The above steps are schematically shown in the schematic view of FIG. 1.

The zeolite substance having an MWW-type structure can be synthesized, for example, by a conventionally known direct synthesis method or a post-synthesis method such as atom planting. In synthesizing the zeolite substance by atom planting, this may be attained, for example, by synthesizing a molecular sieve with an MWW structure containing boron and/or aluminum and after removing at least a part of boron or aluminum by a water vapor treatment or the like, followed by contacting the molecular sieve with an element-containing compound such as metal chloride. The details of the atom planting process are available in page 142 of the above-mentioned "*Zeolite no Kagaku to Kogaku*".

In view of the production efficiency, the zeolite substance having an MWW structure of the present invention may preferably be produced by the production process of the present invention (I). That is, the process for producing a zeolite substance having an MWW structure of the present invention (I) is characterized by comprising four steps, that is, a step of heating a mixture containing a template compound, a compound containing a Group 13 element of the periodic table, a silicon-containing compound and water to obtain a precursor (A), a step of acid-treating the obtained precursor (A), a step of heating the acid-treated precursor (A) together with a mixture containing a template compound, an element-containing compound and water to obtain a precursor (B), and a step of calcining the obtained precursor (B) to obtain a zeolite substance having an MWW structure.

(First Step)

The first step of the above production process is described. The first step in the process for producing a zeolite substance having an MWW structure of the present invention (I) is a step for heating a mixture containing a template compound, a compound containing a Group 13 element of the periodic table, a silicon-containing compound and water, to thereby obtain a precursor (A).

The term "template compound" as used herein means a compound having an activity of specifying the structure, particularly the pore shape, at the time of synthesizing zeolite having an MWW structure. The template compound is not particularly limited as long as it can be removed afterward by calcination. Specific examples of the template compound may generally include nitrogen-containing compounds, preferably an amine and/or quaternary ammonium compound. Examples of the amine may generally include a nitrogen-containing compound and specific examples include piperidine, hexamethyleneimine and/or a mixture of piperidine and hexamethyleneimine. However, the present invention is not limited thereto.

The compound containing a Group 13 element of the periodic table (i.e., the 18-group type periodic table based on the IUPAC Recommendation in 1990 as described in "Kagaku Binran" (Handbook for Chemistry), 4th revised edition, page I-56), which can be used in the first step, is not particularly limited but may preferably be a boron compound, an aluminum compound or a gallium compound, more preferably a boron compound, in view of the easy provision of an intended MWW structure precursor, and easy removal in the subsequent step. Specific preferred examples thereof include a boric acid, however, this compound can also be used in the form of a borate such as sodium borate.

The silicon-containing compound which can be used in the first step is not particularly limited. Specific examples thereof include silicic acid, silicate, silicon oxide, silicon halide, fumed silicas, tetraalkyl ortho-silicate and colloidal silica. In any case, a high-purity compound (e.g., those having a silicon proportion of 98% or more with respect to all the metal elements to be contained therein) is preferred. Particularly, in the case of colloidal silica, a smaller alkali content (e.g., those having an alkali content of 0.01 or less in terms of alkali/silicon molar ratio) is more preferred.

The ratio between boron and silicon in a mixture of the first step may preferably be, in terms of the molar ratio, in the range of boron:silicon=0.01-10:1, more preferably in the range of boron:silicon=0.05-5:1, more preferably in the range of boron:silicon=0.3-3:1. As describe hereinafter, the precursor (A) is intended to be synthesized, under an alkali metal-free condition, it is necessary to use a large amount of boron, the ratio may preferably be in the range of boron:silicon=0.3-2:1, more preferably in the range of boron:silicon=1-2:1.

The ratio between water and silicon in the mixture of the first step may preferably be, in terms of the molar ratio, water:silicon=5 to 200:1, more preferably water:silicon=15 to 50:1. If this ratio is too small, it is difficult to obtain a mixture having a good quality. If this ratio is too large, the productivity will become worse.

The ratio between the template compound and silicon in the mixture of the first step may preferably be, in terms of the molar ratio, template compound:silicon=0.1 to 5:1, more preferably template compound:silicon=0.3 to 3:1, still more preferably template compound silicon=0.5 to 2:1. If this ratio is too small, it is difficult to obtain an intended product. If this ratio is too large, a considerable amount of the template compound can be wasted, and such a process is not economical.

Further, it is also useful to add a seed crystal in addition to these raw materials. In this case, it is sometimes possible to expect an effect of shortening the crystallization time or providing a product having a small particle size. As the seed crystal, it is preferred to use a substance having an MWW structure or a structure similar to MWW such as precursor therefor having a layered structure (e.g., MCM-22 (P)), which has preliminarily been synthesized. It is particularly preferred to use a layered-structure precursor for an MWW type zeolite substance containing boron. For example, it is possible to add a part of a precursor (A) obtained in the past first step, to a mixture to be used in the first step as the seed crystal. The timing for the addition thereof is not particularly limited, but it is possible that all the other raw materials are mixed, the seed crystal is added to the resultant mixture, and thereafter the mixture is stirred and then heated. As the amount of the seed crystal to be added, the molar ratio of silicon contained in the seed crystal to the silicon in the silicon-containing compound to be used as main raw material may preferably be a ratio of seed crystal:main raw material=0.0001-0.2:1, more preferably 0.001-0.05:1. If the addition amount is to small, it is difficult to obtain the above-mentioned effect. If the addition amount is to large, the productivity will become lower.

As another additive, it is possible to add a compound including an alkali metal such as sodium or potassium, and in such a case the crystallization time can sometimes be shortened. In general, the presence of alkali metal can provide a tendency such that it can inhibit the introduction of an element other than boron, aluminum, and silicon into the framework of a zeolite substance, or it can promote the condensation of a compound including the element to be incorporated into the framework to form the condensation product of such a compound per se. As an example, it is a well-known fact that titanium does not enter the zeolite framework in a good manner, if an alkali metal is present in the system in the case of synthesis of titanosilicate such as TS-1, and the added titanium source is incorporated into the product as titania or the species similar to titania. However, in the present invention, even when an alkali metal is used in the first step, it is also possible to substantially remove the alkali metal in the acid treatment (second step), prior to the step for introducing the metal species into the framework (third step). Accordingly, it is also possible to use an alkali metal in the first step of this invention, and it is possible that an alkali metal is present in a molar ratio of alkali metal: silicon:=0.0001-0.2:1, more preferably about 0.001-0.1:1. As the alkali metal source, there are hydroxides, nitric acid salts, chlorides, sulfuric acid salts, salt of other metal acid, but a hydroxide or borate may most preferably be used.

The heating temperature in the first step is not particularly limited but in the case of synthesizing a precursor (A), this may preferably be performed under hydrothermal reaction conditions. The term "hydrothermal reaction" as used herein means, as described in "Hydrothermal Reaction" of *Hyojun Kagaku Yogo Jiten* (*Glossary for Standard Chemistry*), compiled by Nippon Kagaku Kai, Maruzen (Mar. 30, 1991), a synthesis or modification reaction of a substance performed in the presence of high-temperature water, particularly high-temperature high-pressure water. In particular, a synthesis reaction using the hydrothermal reaction is referred to as "hydrothermal synthesis". Accordingly, the heating in the first step may preferably be performed by placing a mixture containing a template compound, a boron-containing compound, a silicon-containing compound and water in a closed container such as autoclave, under hydrothermal synthesis conditions of applying a pressure while heating. The temperature may preferably be from 110 to 200° C., more preferably from 120 to 190° C.

If the temperature in the hydrothermal synthesis is less than this range, the objective product may not be obtained or even if obtained, the heating may take a long time and this is not practical. On the other hand, if the temperature exceeds this range, the purity of the obtained zeolite substance disadvantageously decreases.

The hydrothermal synthesis time is usually from 2 hours to 30 days, preferably from 3 hours to 10 days. If the hydrothermal synthesis time is less than this range, crystallization may proceed insufficiently to fail in obtaining a high-performance precursor (A). On the other hand, even if the hydrothermal synthesis is performed for a time period exceeding this range, the performance of the precursor (A) is not substantially enhanced but rather adverse effects may be caused such as conversion into other phase or increase of the particle size and this it not preferred.

(Second Step)

The second step is described below. The second step is a step of acid-treating the precursor (A) obtained in the first step or first-2 step to obtain a deboronated silicate.

The precursor (A) obtained in the first step may be acid-treated as it is but when the precursor is calcined (first-2 step) before the acid treatment and thereafter acid-treated, boron inside the framework can be more efficiently removed. Thus, utilizing this first-2 step is preferable. Hereinbelow, the precursors obtained in the first step and the first-2 step are inclusively referred to as "precursor (A)".

The term "acid treatment" as used herein means contacting with an acid, more specifically, to contact the precursor (A) obtained in the first step with a solution containing an acid or with an acid itself. The contacting method is not particularly limited and a method of spraying or coating an acid or an acid solution on the precursor (A) or a method of dipping the precursor (A) in an acid or an acid solution may be used. The method of dipping the precursor (A) in an acid or an acid solution is preferred because this dipping method is simple and easy.

The acid used for this step may be an inorganic acid, an organic acid or a salt thereof. Specific preferred examples of the inorganic acid include a hydrochloric acid, a sulfuric acid, a nitric acid and a phosphoric acid. Specific preferred examples of the organic acid include a formic acid, an acetic acid, a propionic acid and a tartaric acid. Examples of the salt thereof include an ammonium salt.

In the case of using the acid as a solution, the solvent therefor is not particularly limited. Specific examples of the solvent include water, alcohols, ethers, esters and ketones. Among these, water is preferred.

The acid concentration is also not particularly limited. The preferred range thereof can vary depending on the temperature. When the acid concentration is low, the removal of boron is less liable to occur. When acid concentration is too high and the temperature is too high, the precursor (A) per se can be dissolved. Accordingly, the acid is suitably used in a concentration of 0.1 to 10 mol/liter. The treatment may be performed at a temperature of 0 to 200° C. but may preferably be performed at 50 to 180° C., more preferably from 60 to 150° C. The treatment time is from 0.1 hour to 3 days, preferably from 2 hours to 1 day.

It is also possible to conduct the cycle of (the first-2 step→second step) plural times, in order to minimize the residual content of boron.

(Third Step)

The third step is described below. The third step is a step of heating the deboronated silicate obtained in the second step, together with a mixture containing a template compound, an element-containing compound and water to obtain a precursor (B).

The "template compound" as used herein is, similarly to that used in the first step, a compound having an activity of specifying the structure, particularly the pore shape at the synthesis of a zeolite having an MWW structure. This compound is not particularly limited as long as it can be removed afterward by calcination. Examples thereof generally include a nitrogen-containing compound and specific examples thereof include piperidine, hexamethyleneimine and/or a mixture of piperidine and hexamethyleneimine, however, the present invention is not limited thereto.

The template compound used in the third step may be the same as or different from the template compound used in the first step. In view of the efficiency of metal introduction, the template compound used in the third step may preferably be hexamethyleneimine.

The element-containing compound which can be used in the third step is not particularly limited, as long as it contains a group 3-14 element (particularly, as a metal at least one member selected from the group consisting of titanium, zirconium, vanadium, niobium, tantalum, chromium, molybdenum, tungsten, manganese, iron, cobalt, nickel, zinc, gallium, indium, tin and lead). Specific examples of, for example, the titanium-containing compound include titanium oxide, titanium halide and tetraalkyl ortho-titanates, however, the present invention is not limited thereto. Among these, titanium halide and tetraalkyl ortho-titanates are preferred in view of easy and simple handleability. Specifically, titanium tetrafluoride, tetraethyl ortho-titanate, tetrapropyl ortho-titanate, tetrabutyl ortho-titanate and the like are suitably used.

Examples of the zirconium-containing compound include zirconium oxide, zirconium halide and zirconium tetraalkoxides, however, the present invention is not limited thereto. Among these, zirconium halide and zirconium tetraalkoxides are preferred in view of simple and easy handleability. Specifically, zirconium tetrafluoride, zirconium tetraethoxide, zirconium tetrabutoxide and the like are suitably used.

Examples of the vanadium-containing compound include vanadium oxide, vanadium halide and vanadium trialkoxide oxides, however, the present invention is not limited thereto. Among these, vanadium halide and vanadium trialkoxide oxides are preferred in view of easy and simple handleability. Specifically, vanadium trichloride and vanadium oxytriisopropoxide are suitably used.

Examples of the niobium-containing compound include niobium oxide, niobium halide and niobium tetraalkanoates, however the present invention is not limited thereto. Among these, niobium tetraalkanoates are preferred in view of easy and simple handleability. Specifically, niobium tetrakis(2-ethylhexanoate) is suitably used.

Examples of the tantalum-containing compound include tantalum oxide, tantalum halide and tantalum disulfide, however, the present invention is not limited thereto. Specifically, tantalum disulfide is suitably used.

Examples of the chromium-containing compound include chromium acetate, chromium nitrate and chromium halide, however, the present invention is not limited thereto. Specifically, chromium nitrate is suitably used.

Examples of the molybdenum-containing compound include molybdenum oxide, molybdenum halide and molybdenum sulfide, however, the present invention is not limited thereto. Specifically, molybdenum trichloride is suitably used.

Examples of the tungsten-containing compound include tungsten oxide and tungsten halide, however, the present invention is not limited thereto. Specifically, tungsten tetrachloride is suitably used.

Examples of the manganese-containing compound include manganese oxide, manganese halide, manganese acetate and manganese acetylacetonate, however, the present invention is not limited thereto. Specifically, manganese trisacetylacetonate is suitably used.

Examples of the iron-containing compound include iron oxide, iron halide, iron acetate and iron nitrate, however, the present invention is not limited thereto. Specifically, iron nitrate is suitably used.

Examples of the cobalt-containing compound include cobalt oxide, cobalt halide and cobalt trisacetylacetonate, however, the present invention is not limited thereto. Specifically, cobalt trisacetylacetonate is suitably used.

Examples of the nickel-containing compound include nickel oxide, nickel halide, nickel nitrate and nickel acetate, however, the present invention is not limited thereto. Specifically, nickel nitrate, nickel acetate and the like are suitably used.

Examples of the zinc-containing compound include zinc oxide, zinc halide, zinc acetate and zinc nitrate, however, the present invention is not limited thereto. Specifically, zinc acetate, zinc nitrate and the like are suitably used.

Examples of the gallium-containing compound include gallium oxide, gallium halide and gallium nitrate, however, the present invention is not limited thereto. Specifically, gallium nitrate, gallium trichloride, gallium trifluoride and like are suitably used.

Examples of the indium-containing compound include indium oxide, indium halide and trialkoxy indiums, however, the present invention is not limited thereto. Specifically, indium trichloride, indium trifluoride, indium triisoproxide and the like are suitably used.

Examples of the tin-containing compound include tin oxide, tin halide and tetraalkoxy tins, however, the present invention is not limited thereto. Specifically, tin tetrachloride, tin tetrafluoride, tetra-tert-butoxy tin and the like are suitably used.

Examples of the lead-containing compound include lead oxide, lead halide, tetraalkoxy lead, however, the present invention is not limited thereto. Specifically, lead acetate, lead chloride, lead nitrate, lead acetylacetonate, lead sulfate and the like are suitably used.

The precursor (B) obtained in the third step can be synthesized by previously mixing all of the acid-treated precursor obtained in the second step, a template compound, an element-containing compound and water and heating the mixture to perform a so-called hydrothermal synthesis similarly to the first step.

The order of mixing is not particularly limited. For example, in order to homogenize the raw material composition, it is preferred that at first, a mixture liquid comprising water, a template compound, and element-containing compound is prepared, and the acid treated precursor provided in the second step is added to the resultant mixture. Further, the mixture liquid comprising water, a template compound, and the element-containing compound may preferably be a uniform solution rather than slurry, and it is desirable to devise the kind and concentration of the element-containing compound or mixing condition (temperature, time) so as to obtain such a solution.

In the mixture of the third step, the ratio of the element to silicon in the acid-treated precursor may preferably be, in terms of the molar ratio, element:silicon=0.001 to 0.3:1, more preferably element:silicon=0.005 to 0.2:1, still more preferably element:silicon=0.01 to 0.2:1. The above ratio may preferably be as large as possible in view of the appearance of the characteristic derived from the introduced element. However, if the ratio is too large, the element can undesirably form an impurity phase by itself.

In the third step, the ratio of water to silicon in the acid-treated precursor may preferably be, in terms of the molar ratio, water:silicon=5 to 200:1, more preferably water:silicon=15 to 50:1. If the ratio is too small, it is difficult to obtain a mixture having a good quality. If the ratio is too large, the productivity will be lowered.

In the third step, the ratio of the template compound to silicon in the acid-treated precursor may preferably be, in terms of the molar ratio, template compound:silicon=0.1 to 5:1, more preferably template compound:silicon=0.3 to 3:1, still more preferably template compound:silicon=0.5 to 2:1. If this ratio is too small, it is difficult to obtain an intended product. If this ratio is too large, a considerable amount of the template compound can be wasted, and such a process is not economical.

As for the conditions of hydrothermal synthesis in the third step, the same conditions as described for the first step may be applied. However, when a compound containing an element of 3-14 group is co-present in the third step, it is possible that the adequate synthesis condition is considerably different from that in the first step. Particularly, with respect to the temperature and time, it is desirable to select the condition depending on the element to be co-present, so as to provide an intended precursor (B) having a high purity. As described in Examples appearing hereinafter, when the temperature is too high, or time is too long, the product can be changed into a substance having another structure such as ZSM-39 (structure cord MTN) instead of the intended precursor (B).

In addition, as an embodiment of the third step, it is also possible to use a so-called dry gel method wherein a mixture (mixture X) of the acid-treated precursor provided in the second step and the element-containing compound, and a mixture of water and the template compound (mixture Y) are charged separately, and the mixture (mixture X) of the acid-treated precursor provided in the second step and the metal-containing compound is caused to contact the vapor of water and the template compound. In this case, there is a merit that the template compound which has not been used for the crystallization can be recovered easily.

With respect to the details of this dry gel method, e.g., page 28 of the above-mentioned "Zeolite no Kagaku to Kogaku" may be referred to.

The mixture X can be obtained by a method wherein a solution of an element-containing compound is dispersed in the acid-treated precursor obtained in the second step as uniformly as possible by use of impregnation, dipping, etc., then dried, and pulverized as desired. The drying can be conducted by various methods such as air drying at room temperature, vacuum drying at high temperature. In general, an aqueous solution is frequently used, and therefore it is sufficient to effect the drying at 50-80° C. for 1-24 hours. The end point of the drying is such that the product in a crushable state.

The mixture Y may be obtained by mixing a template compound and water.

In the dry gel method, the kind of the template compound to be used, the kind of the element-containing compound to be co-present, the ratio of the element being co-present to silicon in the precursor, and the ratio of the template compound to silicon in the precursor may be the same as those as described in the case of the above-described normal hydrothermal synthesis.

The ratio of water to silicon in the precursor is different from the normal hydrothermal synthesis in the adequate range, and may preferably be in terms of molar ratio, water:silicon=0.01-15:1, more preferably is water:silicon=0.1-10:1.

The method of charging the mixture X and the mixture Y may be any method, as long as the mixture X and the mixture Y cannot be mixed with each other unless the mixture Y is heated to be vaporized. For example, it is possible to achieve such charging by a method wherein the mixture Y is placed in the bottom of an autoclave and a container containing the mixture X is hung in the middle part of the autoclave.

By the above-mentioned first to third steps, it is possible to obtain the precursor (B) for a MWW type zeolite substance. When a compound containing at least one element selected from the elements of 3 group to 14 group is co-present in the third step, a precursor (B) containing such a metal can be obtained. When the precursor (B) is subjected to the calcining step to be referred to as the fourth step, the precursor can be converted into an MWW type zeolite substance when the precursor (B) is subjected to layer-exfoliation in the presence of a surfactant, in a similar manner as in the case of ITQ-2, a thin-layered substance may be obtained. Of course, it is also possible that, in a similar manner as in the case of MCM-36, the precursor is swollen and then treated with alkoxysilane, etc., so that pillars are formed between the layers (pillaring) to thereby obtain cross-linking type layered substance. Various kinds of metal-containing layered compounds can be produced by such processes.

By the above-mentioned first to third steps, it is possible to obtain the precursor (B) for a MWW type zeolite substance (B). The formation of the precursor (B) can be confirmed, e.g., by the powder X-ray diffraction pattern thereof.

(Fourth Step)

The fourth step is described below. The fourth step is a step of calcining the precursor obtained in the third step or third-2 step to obtain a zeolite substance.

Hereinbelow, the precursors obtained in the third step and third-2 step are inclusively referred to as "precursor (B)".

The method for the calcination of precursor performed between the first step and the second step (first-2 step) and in the fourth step is not particularly limited and the calcination can be performed under conditions known for normal catalyst calcination. The calcination may be performed in a closed system or a flow system and as long as an oxygen necessary for the burning of the template compound is present. The calcination in the air is most easy, but it is also possible that for the purpose of avoiding the excessive heat production, the precursor is heated to a predetermined temperature in an inert gas stream such as nitrogen to degrade the template inside, and then oxygen is introduced to thereby remove the residue by burning. The calcination temperature may preferably be from 200 to 700° C., more preferably from 300 to 650° C., most preferably from 400 to 600° C. If the calcination temperature is less than 200° C., the template compound may not be satisfactorily removed, whereas if it exceeds 700° C., the MWW-type crystal structure may be broken and this disadvantageously causes an adverse effect on the precursor performance in the case of calcination of the first-2 step and on the quality of the resultant zeolites in the case of calcination of the fourth step.

The temperature rising rate at the calcinations may preferably be 1° C./min but is not limited thereto if breakage of the MWW-type structure does not occur.

The production process of an MWW-type zeolite substance of the present invention (I) is described more specifically below, while referring to FIG. 1 as a view for schematically showing the series of these steps. Referring to FIG. 1, the production process of the present invention (I) is a method wherein a layered precursor (A) to be converted into an MWW-type borosilicate is synthesized from a boric acid and a silicon-containing compound using piperidine or hexamethyleneimine as the template (the above procedure is the first step), and acid-treating the layered precursor borosilicate (the above procedure is the second step) to synthesize a deboronated silicate (acid-treated precursor (A)). Prior to the second step, it is also possible to calcine the layered precursor to be converted into the MWW-type borosilicate (the first-2 step). Then, an element-containing layered precursor (B) is synthesized from the deboronated silicate and an element-containing compound using piperidine or hexamethyleneimine as the template (the above procedure is the third step), and calcining the element-containing layered precursor (the above procedure is the fourth step) to remove the template, whereby a zeolite substance having an MWW structure is obtained.

The zeolite substance which can be obtained by the production process of the present invention (I) can be used as it is as a catalyst in an oxidation reaction, however, the oxide of element, which is generated as a result of condensation of element itself present in the zeolite substance obtained by the production process and not contributing to the oxidation reaction, can be at least partially removed by contacting the zeolite substance with an acid. By this contacting with an acid, an MWW-type zeolite catalyst having higher performance can be obtained.

The "contacting with an acid" as used herein is effective even if it is performed before or after or both before and after the calcination in the fourth step, but this treatment is most effective when applied in the precursor (B) state before the calcination (third-2 step). Thereby, the production of an oxide of element that may be generated by the calcination of a by-product due to condensation of the element compound itself can be greatly inhibited.

The "contacting with an acid" used here has the same meaning as the "contacting with an acid" described in the second step and as for the contacting method, the acid used for the contacting, the concentration of acid used for the contacting, the timing of contacting and when the acid is used as a solution, the solvent and the like, the conditions described in the second step can be applied.

The present invention (II) is described below. The present invention (II) is, e.g., a layered precursor and a zeolite substance which can be synthesized by the production process of a zeolite substance having an MWW-type structure and a layered precursor therefor of the present invention (I). These layered precursor or zeolite substance contains, in addition to silicon, at least one element selected from the group consisting of 3, 4, 5, 6, 7, 8, 9, 10, 11, and 12 group elements (in the fourth period or more) and gallium, indium, tin and lead. Further, there is provided a substance wherein at least a part of these elements is incorporated into the framework of the zeolite or layered compound.

More specifically, main embodiments of the present invention (II) may include the following embodiments.

(1) A metallosilicate substance having an MWW structure containing at least one element selected from the elements belonging to Groups 3 to 14, in the Period 4 or more of the periodic table.

(2) A metallosilicate substance having an MWW structure containing at least one element selected from the elements belonging to Groups 3 to 14, in the Period 5 or more of the periodic table.

(3) A metallosilicate substance having an MWW structure containing at least one element selected from the group consisting of titanium, zirconium, vanadium, niobium, tantalum, chromium, molybdenum, tungsten, manganese, iron, cobalt, nickel, zinc, gallium, indium, tin and lead.

(4) A metallosilicate substance for a zeolite substance having an MWW structure produced by the above-mentioned process.

(5) A layered precursor metallosilicate substance for a zeolite substance having an MWW structure containing at least one element selected from the elements belonging to Groups 3 to 14, in the Period 4 or more of the periodic table.

(6) A layered precursor metallosilicate substance for a zeolite substance having an MWW structure containing at least one element selected from the elements belonging to Groups 3 to 14, in the Period 5 or more of the periodic table.

(7) A layered precursor metallosilicate substance for a zeolite substance having an MWW structure containing at least one element selected from the group consisting of titanium, zirconium, vanadium, niobium, tantalum, chromium, molybdenum, tungsten, manganese, iron, cobalt, nickel, zinc, gallium, indium, tin and lead.

(8) A layered precursor metallosilicate substance for a zeolite substance having an MWW structure produced by the above-mentioned process.

Further, there is a metallosilicate substance having an MWW structure containing, as an element other than silicon, at least one element selected from the group consisting of titanium, zirconium, vanadium, niobium, tantalum, chromium, molybdenum, tungsten, manganese, iron, cobalt, nickel, zinc, gallium, indium, tin and lead.

Further preferably, there is a metallosilicate substance having an MWW structure containing, in addition to silicon, at least one element selected from the group consisting of titanium, zirconium, vanadium, niobium, tantalum, chromium, molybdenum, tungsten, manganese, iron, cobalt, nickel, zinc, gallium, indium, tin and lead, and also at least partially of the element are held in framework of MWW structure.

The structure code MWW is one of known molecular sieve structures and its characteristic feature is to have a pore composed of an oxygen 10-membered ring, and a supercage (0.7×0.7×1.8 nm). Details on the structure are described, for example, in Atlas, 5th ed. or can be read on the internet, the homepage of IZA Structure Commission (http://www.iza-structure.org/) (as of February, 2002). Known examples of the molecular sieve having this structure include MCM-22 (*Science*, Vol. 264, 1910 (1994)), SSZ-25 (European Patent 231860), ITQ-1 (*Chem. Mater.*, Vol. 8, 2415 (1996) and *J. Phys. Chem. B*, Vol. 102, 44 (1998)), ERB-1 (European Patent 203032) and PSH-3 (U.S. Pat. No. 449409). The molecular sieve having the structure code MWW can be identified by its characteristic pattern on the X-ray diffraction (hereinafter simply referred to as "XRD"). As for the XRD pattern, for example, a simulation pattern of ITQ-1 can be available on the above-described homepage.

The characteristic diffraction pattern in the MWW structure is shown in the Table 1. The present invention (II) is characterized in that the structure has the following diffraction pattern.

TABLE 1

Powder X-ray diffraction lines provided by MWN structure

| d/Å | relative intensity (s: strong, m: medium, w: weak) |
|---|---|
| 12.3 ± 0.6 | s |
| 11.0 ± 0.6 | s |
| 8.8 ± 0.5 | s |
| 6.2 ± 0.4 | m |
| 5.5 ± 0.3 | w |
| 3.9 ± 0.2 | m |
| 3.7 ± 0.2 | w |
| 3.4 ± 0.2 | s |

The above "d/Å" means that the unit of lattice spacing d is Angstrom.

In addition, when a transition metal is introduced into a silicate, a characteristic absorption may appear in the visible to ultraviolet light region whether the characteristic absorption appears in the UV-VIS spectrum can be an index of a fact that a transition metal is introduced into a silicate framework. While the position of the absorption band may change in various manners depending on the element to be introduced, but in some cases, the present invention (II) may be characterized in that there is an absorption in the region of 300 nm or shorter, particularly 250 nm or shorter.

The layered precursor for an MWW type zeolite substance can also be characterized by the XRD pattern thereof. The characteristic diffraction pattern of the layered precursor for an MWW type zeolite substance is shown in the Table 2. In one aspect, the layered precursor of the present invention (II) is characterized in that the precursor has the following diffraction pattern.

TABLE 2

Powder X-ray diffraction lines provided by layered precursor for MWN type zeolite substance

| d/Å | relative intensity |
| --- | --- |
| 27.6 ± 2 | m |
| 13.5 ± 0.5 | s |
| 12.4 ± 0.6 | s |
| 11.2 ± 0.6 | s |
| 9.1 ± 0.5 | m |
| 6.8 ± 0.4 | w |
| 6.0 ± 0.4 | w |
| 4.5 ± 0.3 | m |
| 3.5 ± 0.2 | w |
| 3.4 ± 0.2 | s |

EXAMPLES

The present invention is described in greater detail below by referring to Examples, however, these Examples only show the outline of the present invention and the present invention is not limited to these Examples.

ANALYZERS IN EXAMPLES AND COMPARATIVE EXAMPLES

Elemental Analysis Method of Zeolite Substance

A sample was weighed into a Teflon (registered trademark of E.I. du Pont de Nemours and Company) beaker and hydrofluoric acid (50 mass %) was added and dissolved. Pure water was added thereto and the elemental analysis was performed using a desk-type inductively coupled plasma spectrometer (JY38S) manufactured by Rigaku.

Powder X-ray diffraction method (XRD)

The powder X-ray diffraction pattern of a sample was measured by using the following apparatus and conditions.
   Apparatus: MX-Labo powder x-rays analysis apparatus mfd. by Mac Science Company
   Radiation source: CuKα ray (1.5405 Angstrom)
   Condition: Output 40 kV–20 mA
   Range: 2Θ=5-50°
   Scanning rate: 2°/minute Ultraviolet visible absorption spectrum method (U V)

The ultraviolet visible absorption spectrum of a sample was measured by a diffuse reflection method by use of the following apparatus, and conditions.
   Apparatus: JASCOUV/VIS spectrometer V-550 mfd. by Nihon Bunko Company
   Measurement range: 200-500 nm
   Standard material for base line: $BaSO_4$ Example 1

Preparation of MWW-Type Tin Silicate

[Preparation of Borosilicate and Acid Treatment]

In 684 g of ion-exchanged water, 243.2 g of piperidine (mfd. by Wako Pure Chemical Industries, Ltd., purity: 98%) (hereinafter, referred to as "PI" was dissolved at 25° C. to prepare an aqueous piperidine solution. To this aqueous piperidine solution, 165.8 g of boric acid (mfd. by Wako Pure Chemical Industries, Ltd., purity: 99.5%) was added under vigorous stirring. The boric acid was completely dissolved under stirring for 30 minutes, and thereafter 120 g of fumed silica (Ca-o-sil M7D) was added thereto and the stirring was further continued for 2 hours to obtain a mixture of $1.SiO_2:0.067.B_2O_3:1.4.PI:19.H_2O$ in terms of molar ratio.

This mixture was transferred to a 2 liter-Teflon-made autoclave (i.e., an autoclave having a Teflon-made liner) and stirred for 120 hours at a rotation speed of 100 rpm at a temperature of 170° C. After stopping the rotation, the contents were cooled to 25° C. and the solid product was separated from the contents by filtration and washed with ion-exchanged water. The washing was repeated until the pH of the washing water became 9 or less. The thus obtained solid product was dried at a temperature of 80° C. and calcined at a temperature of 600° C. With respect to 1 g of the thus obtained solid product, 30ml of nitric acid of 6 mol/l was added so as to effect acid treatment at a temperature of 100° C. for 20 hours. After the completion of the acid treatment, the solid obtained by filtration was calcined at a temperature of 600° C. for ten hours. The molar ratio of boron/silicon of this solid (deboronated silicate A) was 0.0217. Further, with respect to 1 g of the thus obtained solid product, 30 ml of nitric acid of 6 mol/l was added so as to effect acid treatment at a temperature of 100° C. for 20 hours. After the completion of the acid treatment, the solid obtained by filtration was calcined at a temperature of 600° C. for ten hours. The molar ratio of boron/silicon of this solid (deboronated silicate B) was 0.0017.

[Preparation of Sn-MWW]

At 25° C., 14.5 g of PI (purity 98%, mfd. by Wako Pure Chemical Industries Co., Ltd.) was dissolved in 30 g of ion-exchanged water to thereby prepare a PI aqueous solution. To this aqueous PI solution, 1.99 g of tin tetrachloride pentahydrate (mfd. by Wako Pure Chemical Industries, Ltd., purity: 98%) was added under vigorous stirring. After stirring for 30 minutes to completely dissolve the tin tetrachloride, 10 g of the deborosilicate B having a boron/silicon molar ratio of 0.0017, which had been prepared in the above "preparation of borosilicate and acid treatment", was added and the stirring was further continued for 2 hours to obtain a mixture of $1.SiO_2:0.033.SnO_2:1.PI:10.H_2O$ in terms of molar ratio.

This mixture was transferred to a 150 ml-volume Teflon-made autoclave and stirred for 158 hours at a rotation speed of 40 rpm at a temperature of 175° C. After stopping the rotation, the contents were cooled to 25° C. and the solid product was separated from the contents by filtration and washed with ion-exchanged water. The washing was repeated until the pH of the washing water became 9 or less. The thus obtained solid product was dried at a temperature of 80° C., and a part of the solid product was used as a sample for XRD measurement. The remainder of the solid product was calcined for 10 hours at a temperature of 600° C. As the final intended product, an MWW-type tin silicate was obtained. This MWW-type tin silicate had a tin/silicon molar ratio of 0.025 and a boron/silicon molar ratio of 0.0016, and 76 mol % of tin charged was incorporated into the product.

Figure 2:
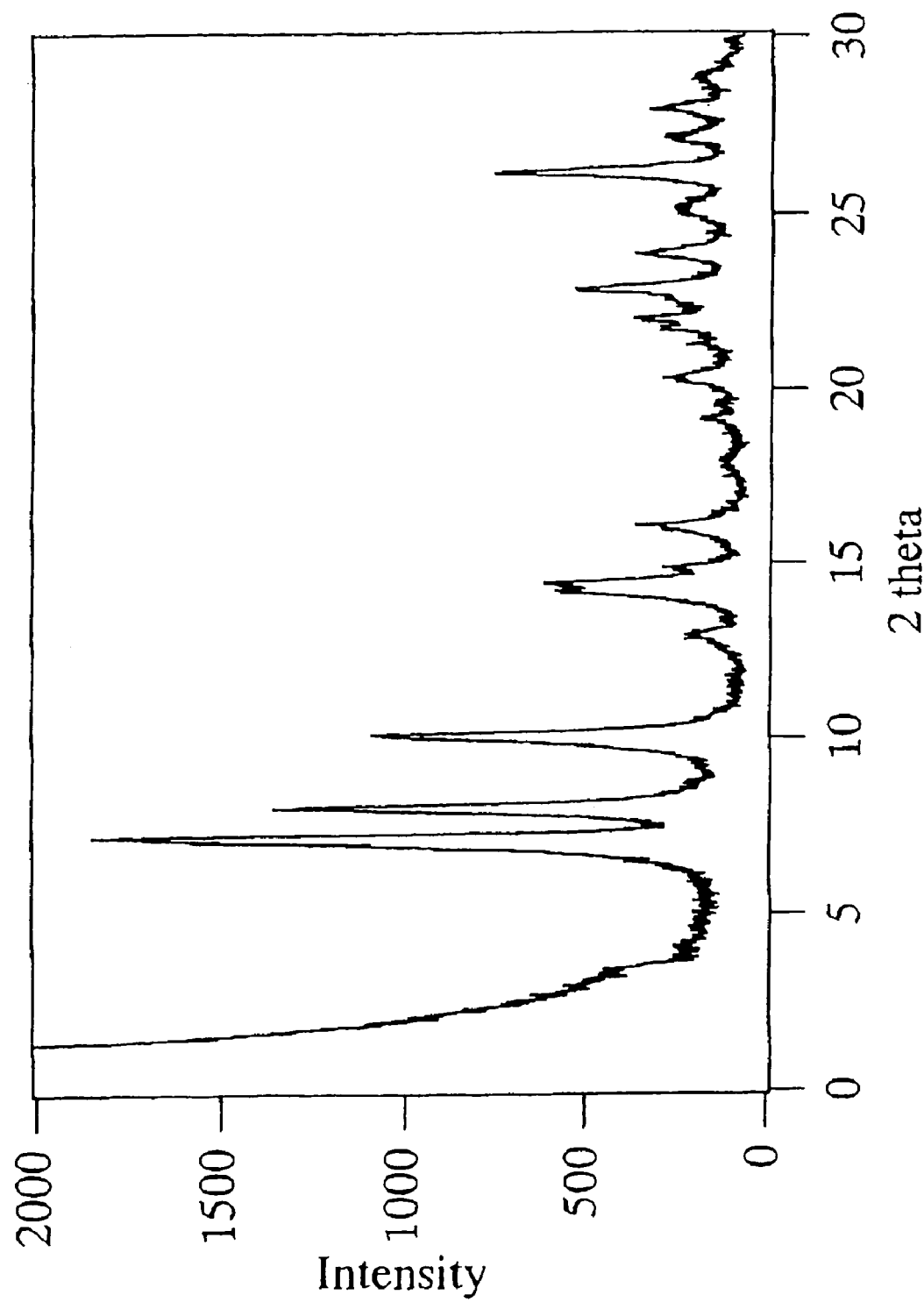
FIG. 2 is a graph showing a powder X-ray diffraction pattern of a tin silicate provided in Example 1.
Figure 3:
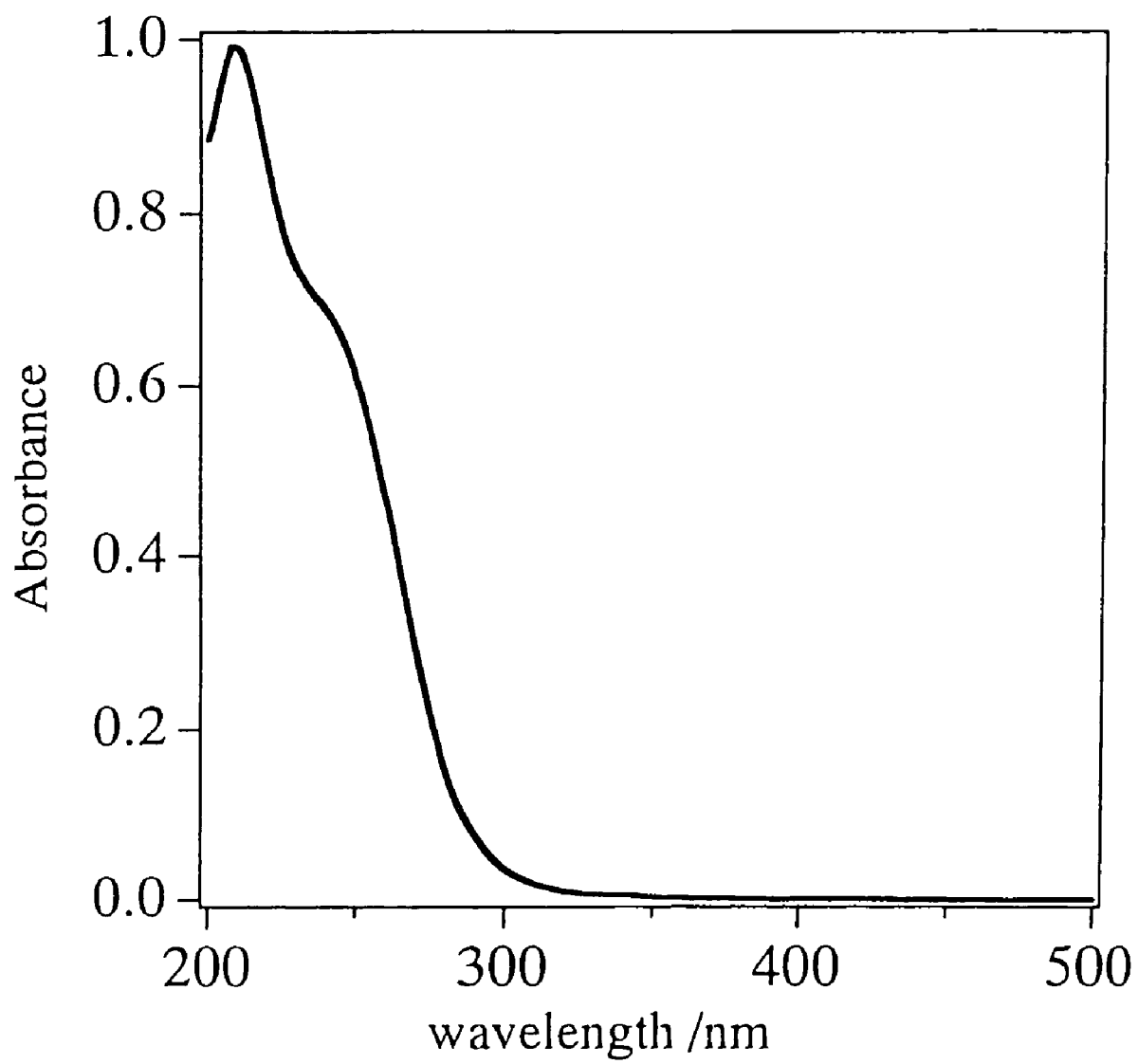
FIG. 3 is a graph showing a UV spectrum of the tin silicate provided in Example 1.

The XRD pattern and UV spectrum of the thus obtained tin silicate are shown in FIGS. 2 and 3, respectively. In the XRD pattern, the diffraction lines shown in Table 1 which was characteristic to the MWW type structure was recognized. In the UV spectrum, absorption was recognized in the region of 250 nm or less, it was found that at least a part of the tin was incorporated into the framework.

Figure 4:
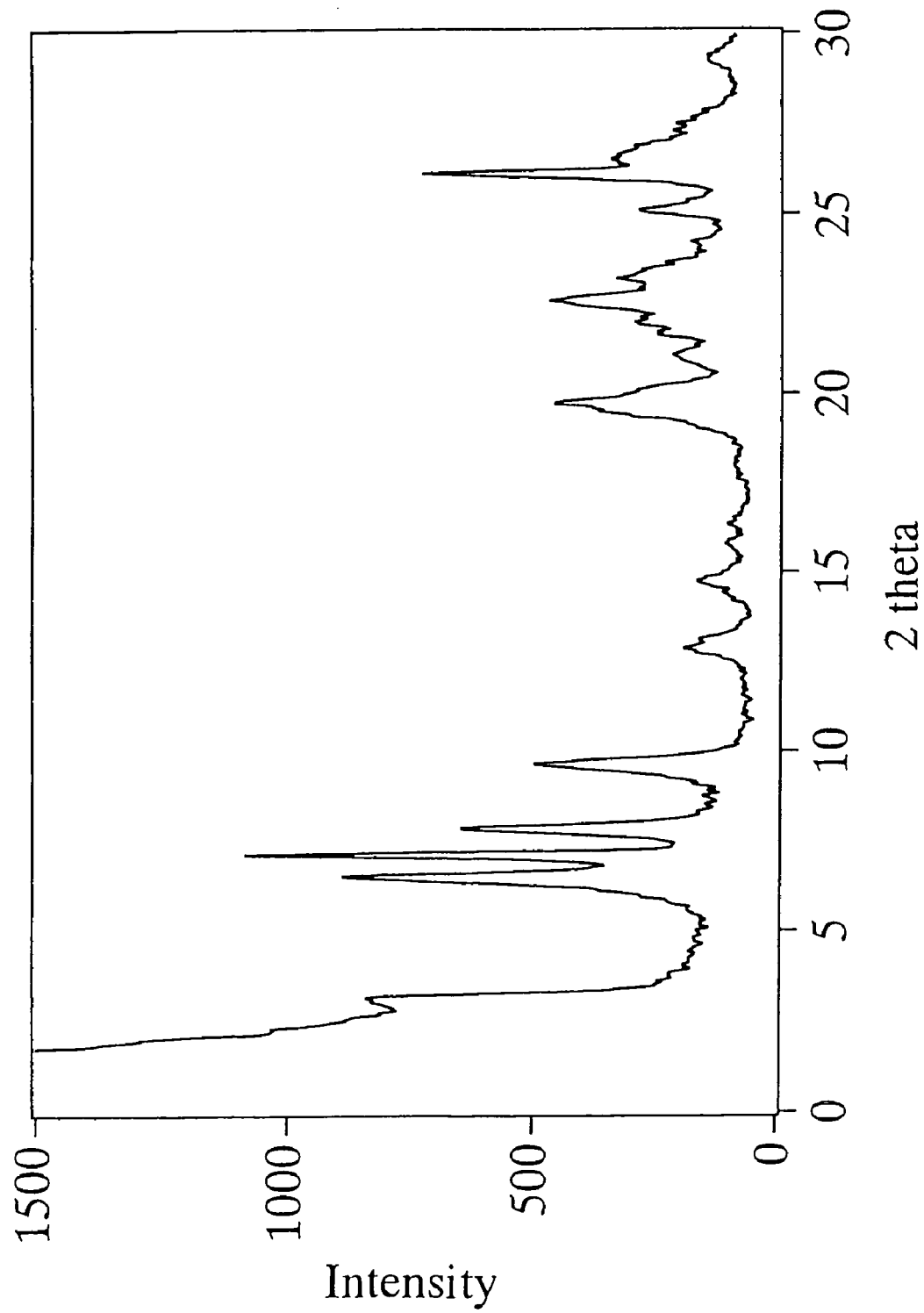
FIG. 4 is a graph showing a powder X-ray diffraction pattern of the tin silicate precursor substance provided in Example 1.

The XRD pattern of layered precursor for the tin silicate is shown in FIG. 4. The diffraction pattern group shown in Table 2 which is characteristic to the layered precursor for the MWW type zeolite substance shown was recognized.

Example 2

Preparation of MWW-Type Zirconium Silicate

In 15 g of ion-exchanged water and 5 g of an aqueous hydrogen peroxide solution (mfd. by Wako Pure Chemical Industries, Ltd., purity: 31%), 7.2 g of PI (mfd. by Wako Pure Chemical Industries, Ltd., purity: 98%) was dissolved at 25° C. to prepare an aqueous PI solution. To this aqueous PI solution, 1.25 g of zirconium (IV) butoxide in 1-butanol solution (mfd. by Wako Pure Chemical Industries, Ltd., purity: 85%) was added under vigorous stirring. After stirring for 30 minutes to completely dissolve the zirconium (IV) butoxide, 5 g of deborosilicate having a boron/silicon molar ratio of 0.0017, which had been prepared in Example 1, was added and the stirring was further continued for 2 hours to obtain a mixture of $1.SiO_2:0.033.ZrO_2:1.PI:15.H_2O$ in terms of molar ratio.

This mixture was transferred to a 150 ml-volume Teflon-made autoclave and stirred for 158 hours at a rotation speed of 40 rpm at a temperature of 175° C. After stopping the rotation, the contents were cooled to 25° C. and the solid product was separated from the contents by filtration and washed with ion-exchanged water. The washing was repeated until the pH of the washing water became 9 or less. The thus obtained solid product was dried at a temperature of 80° C. and calcined for 10 hours at a temperature of 600° C. As the final intended product, an MWW-type zirconium silicate was obtained. This MWW-type zirconium silicate had a zirconium/silicon molar ratio of 0.015 and a boron/silicon molar ratio of 0.0016, and 45 mol % of zirconium charged was incorporated into the product.

Figure 5:
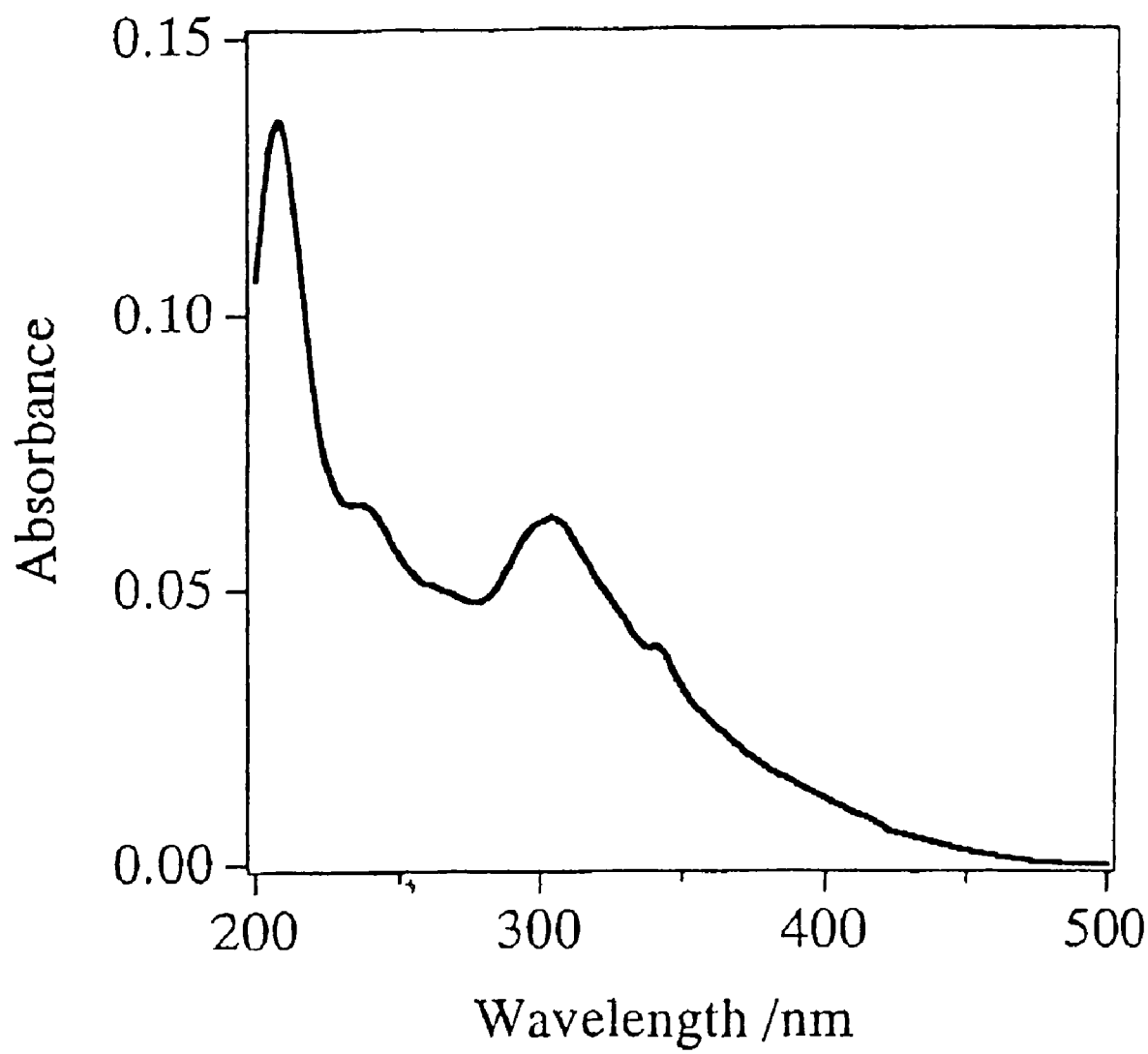
FIG. 5 is a graph showing a UV spectrum of the zirconium silicate provided in Example 2.

In the XRD pattern of the above zirconium silicate, the diffraction lines shown in Table 1 was recognized. In the UV spectrum shown in FIG. 5, absorption was recognized in the region of 250 nm or less.

Example 3

Preparation of MWW Type Vanadium Silicate

At 25° C., 7.2 g of PI (purity 98%, mfd. by Wako Pure Chemical Industries Co., Ltd.) was dissolved in 15 g of ion-exchanged water to thereby prepare a PI aqueous solution. 0.68 g of vanadium compound, vanadium oxytriisopropoxide (purity 95%, mfd. by Aldrich Co.) was added to this piperidine aqueous solution under vigorous stirring. The vanadium compound was completely dissolved under stirring for 30 minutes, and then 5 g of the deboronated silicate B having a 0.0017 molar ratio of the boron/silicon which had been prepared in Example 1, and the stirring was continued for further two hours, to thereby obtain a mixture having a molar ratio of $1.SiO_2:0.017.V_2O_5:1.PI:10.H_2O$.

This mixture was transferred to a 150 ml-volume Teflon-made autoclave and stirred for 15 hours at a rotation speed of 40 rpm at a temperature of 175° C. After stopping the rotation, the contents were cooled to 25° C. and the solid product was separated from the contents by filtration and washed with ion-exchanged water. The washing was repeated until the pH of the washing water became 9 or less. The thus obtained solid product was dried at a temperature of 80° C. and calcined for 10 hours at a temperature of 600° C. As the final intended product, an MWW-type vanadium silicate was obtained.

In the XRD pattern of the above vanadium silicate, the diffraction lines shown in Table 1 was recognized. In the UV spectrum, absorption was recognized in the region of 250 nm or less.

Comparative Example 1

Preparation of MWW Type Vanadium Silicate

A mixture was prepared in the same manner as in Example 3, and this mixture was transferred to a 150 ml-volume Teflon-made autoclave and stirred for 132 hours at a rotation speed of 40 rpm at a temperature of 175° C. After stopping the rotation, the contents were cooled to 25° C. and the solid product was separated from the contents by filtration and washed with ion-exchanged water. The washing was repeated until the pH of the washing water became 9 or less. The thus obtained solid product was dried at a temperature of 80° C.

In the XRD pattern of the above product, the diffraction lines shown in Table 1 was not recognized, and instead, the diffraction lines shown in Table 3 which can be assigned to the MTN structure was recognized. It is considered that the layered precursor for an MWW type structure was converted into the MTN type structure by conducting the hydrothermal reaction for a long time.

TABLE 3

| XRD lines of Comparative Example | |
|---|---|
| d/Å | relative intensity |
| 11.2676 | w |
| 3.8781 | w |
| 5.8624 | s |
| 5.6044 | s |
| 4.8440 | m |
| 4.4579 | m |
| 3.9587 | m |
| 3.7355 | s |
| 3.4373 | m |
| 3.2782 | s |
| 3.0640 | w |

Example 4

Preparation of MWW Type Titanosilicate (Normal Hydrothermal Synthesis Method)

At 25° C., 14.5 g of PI (purity 98%, mfd. by Wako Pure Chemical Industries Co., Ltd.) was dissolved in 30 g of ion-exchanged water to thereby prepare a PI aqueous solution. 2.0 g of tetrabutyl orthotitanate (purity 95%, mfd. by Wako Pure Chemical Industries Co., Ltd.) was added to this PI aqueous solution under vigorous stirring. The tetrabutyl orthotitanate was completely hydrolyzed under stirring for 30 minutes, and then 10 g of the deboronated silicate B having a molar ratio of 0.0017 of the boron/silicon which had been prepared in Example 1, and the stirring was continued for further two hours, tto thereby obtain a mixture having a molar ratio of $1.SiO_2:0.033.TiO_2:1.PI:10.H_2O$.

This mixture was transferred to a 150 ml-volume Teflon-made autoclave and stirred for 15 hours at a rotation speed of 40 rpm at a temperature of 175° C. After stopping the rotation, the contents were cooled to 25° C. and the solid product was separated from the contents by filtration and washed with ion-exchanged water. The washing was repeated until the pH of the washing water became 9 or less. The thus obtained solid product was dried at a temperature of 80° C. With respect to 1 g of the thus obtained solid product, 20 ml of nitric acid of 2 mol/l was added so as to effect acid treatment at a temperature of 100° C. for 20 hours. After the completion of the acid treatment, the solid obtained by filtration was calcined at a temperature of 600° C. for ten hours, to thereby obtain an intended final product of MWW-Type titanosilicaste. The molar ratio of titanium/silicon of this solid was 0.0233. The molar ratio of boron/silicon of this solid was 0.0018.

In the XRD pattern of the thus obtained titanosilicate, the diffraction lines shown in Table 1 was recognized. In the UV spectrum thereof, absorption was recognized in the region of 250 nm or less.

Example 5

Preparation of MWW Type Titanosilicate (Dry Gel Method)

At 25° C., 0.2 g of tetrabutyl orthotitanate (purity 95%, mfd. by Wako Pure Chemical Industries Co., Ltd.) was added to an aqueous solution of 2 g of ion-exchanged water and 1 g of hydrogen peroxide (purity 31%, mfd. by Wako Pure Chemical Industries Co., Ltd.). The resultant mixture was stirred for 30 minutes so as to completely promote the hydrolysis of tetrabutyl orthotitanate and the production of titanium peroxide by the reaction with hydrogen peroxide, and then the stirring was continued for further 30 minutes to thereby obtain a homogeneous solution. To the resultant product, 9 g of ion-exchanged water and 10 g of deboronated silicate A having a molar ratio of the boron/silicon of 0.0217 which had been prepared in Example 1 were added, the stirring was continued for 10 minutes. Thereafter, under stirring, water content was vaporized at a temperature of 100° C. for three hours, to thereby obtain a solid mixture having a molar ratio of $1.SiO_2:0.033.TiO_2$.

This mixture was transferred to a 5 ml-Teflon-made beaker, and charged to a Teflon-made autoclave, to which 1.5 g of ion-exchanged water and 2.5 g of PI (purity 98%, mfd. by Wako Pure Chemical Industries Co., Ltd.) had preliminarily been charged, so that the aqueous PI solution was placed separately, and the reaction system was subjected to static heating for 158 hours at a temperature of 170° C. After 158 h-heating, the contents were cooled to 25° C. and the solid product was separated from the contents by filtration and washed with ion-exchanged water. The washing was repeated until the pH of the washing water became 9 or less. The thus obtained solid product was dried at a temperature of 80° C. With respect to 1 g of the thus obtained solid product, 100 ml of nitric acid of 2 mol/l was added so as to effect acid treatment at a temperature of 100° C. for 20 hours. After the completion of the acid treatment, the solid obtained by filtration was calcined at a temperature of 600° C. for ten hours, to thereby obtain a final intended product of MWW-type titanosilicate. The molar ratio of titanium/silicon of this MWW-type titanosilicate was 0.0167, and the molar ratio of boron/silicon thereof was 0.0018.

In the XRD pattern of the thus obtained titanosilicate, the diffraction lines shown in Table 1 was recognized. In the UV spectrum thereof, absorption was recognized in the region of 250 nm or less.

INDUSTRIAL APPLICABILITY

As described hereinabove, according to the present invention, it is clear that, according to the production process of the present invention (i.e., process for producing a zeolite substance having an MWW-type structure), elements having a large ionic radius, which are difficult to be incorporated into the framework, can be introduced with good efficiency, as compared with conventionally known methods for producing a zeolite substance having an MWW-type structure, and a zeolite substance having such an element in the framework and having an MWW-type structure, and a layered precursor therefor, which have been heretofore difficult to obtain, can be obtained.

The invention claimed is:

1. A process for producing a zeolite substance having an MWW structure, comprising the following first to fourth steps:

First Step:
   a step of heating a mixture containing a template compound, a compound containing a Group 13 element of the periodic table, a silicon-containing compound and water to obtain a precursor (A);

Second Step:
   a step of acid-treating the precursor (A) obtained in the first step;

Third Step:
   a step of heating the acid-treated precursor (A) obtained in the second step together with a mixture containing a template compound and water to obtain a precursor (B); and Fourth Step:
   a step of calcining the precursor (B) obtained in the third step to obtain a zeolite substance.

2. The process for producing a zeolite substance according to claim 1, wherein the compound containing a Group 13 element of the periodic table used in the first step is a boron-containing compound.

3. The process for producing a zeolite substance according to claim 2, wherein the boron-containing compound is at least one member selected from the group consisting of boric acid, borate, boron oxide, boron halide and trialkylborons.

4. The process for producing a zeolite substance according to claim 2, wherein the ratio between boron and silicon in the mixture of the first step is boron:silicon=0.01 to 10:1 in terms of the molar ratio.

5. The process for producing a zeolite substance according to claim 2, wherein the ratio between boron and silicon in the mixture of the first step is boron:silicon=0.05 to 5:1 in terms of the molar ratio.

6. The process for producing a zeolite substance according to claim 1 or 2, wherein the following first-2 step is performed between the first step and the second step, and the substance obtained in the first-2 step is used instead of the precursor (A) in the second step:

First-2 Step:

a step of calcining a part or entirety of the precursor (A) obtained in the first step.

7. The process for producing a zeolite substance according to claim 6, wherein the calcining temperature in the first-2 step is from 200 to 700° C.

8. The process for producing a zeolite substance according to claim 1, wherein the following third-2 step is performed between the third step and the fourth step, and the substance obtained in the third-2 step is used instead of as the precursor (B) in the fourth step:

Third-2 Step:

a step of acid-treating a part or entirety of the precursor (B) obtained in the third step.

9. The process for producing a zeolite substance according to claim 1, wherein in the third step, a compound containing at least one element selected from the elements belonging to Groups 3 to 14 of the periodic table is present together with the acid-treated precursor (A) obtained in the second step.

10. The process for producing a zeolite substance according claim 9, wherein the at least one element selected from the elements belonging to Groups 3 to 14 of the periodic table is at least one element selected from the group consisting of titanium, zirconium, vanadium, niobium, tantalum, chromium, molybdenum, tungsten, manganese, iron, cobalt, nickel, zinc, gallium, indium, tin and lead.

11. The process for producing a zeolite substance according to claim 1, wherein the template compound is a nitrogen-containing compound.

12. The process for producing a zeolite substance according to claim 11, wherein the nitrogen-containing compound is an amine and/or quaternary ammonium compound.

13. The process for producing a zeolite substance according to claim 11, wherein the nitrogen-containing compound is at least one member selected from the group consisting of piperidine, hexamethyleneimine and a mixture of piperidine and hexamethyleneimine.

14. The process for producing a zeolite substance according to claim 1, wherein the silicon-containing compound is at least one member selected from the group consisting of silicic acid, silicate, silicon oxide, silicon halide, fumed silicas, tetraalkyl ortho-silicates and colloidal silica.

15. The process for producing a zeolite substance according to claim 1, wherein the ratio between water and silicon in the mixture of the first step is water:silicon=5 to 200:1 in terms of the molar ratio.

16. The process for producing a zeolite substance according to claim 1, wherein the ratio between the template compound and silicon in the mixture of the first step is template compound:silicon=0.1 to 5:1 in terms of the molar ratio.

17. The process for producing a zeolite substance according claim 1, wherein the heating temperature in the first step is from 110 to 200° C.

18. The process for producing a zeolite substance according to claim 1, wherein the acid used for the acid-treated in the second step is a nitric acid.

19. The process for producing a zeolite substance according to claim 1, wherein the heating temperature in the third step is from 110 to 200°C.

20. The process for producing a zeolite substance according to claim 1, wherein the calcining temperature in the fourth step is from 200 to 700° C.

21. The process for producing a zeolite substance according to claim 1, wherein in the third step, the acid-treated precursor (A) obtained in the second step and the mixture containing a template compound and water are previously mixed and then heated.

22. The process for producing a zeolite substance according to claim 1, wherein a dry gel method of charging the acid-treated precursor (A) obtained in the second step and the mixture containing a template compound and water while isolating the precursor (A) and the mixture from each other, and contacting the vapor of the mixture containing a template compound and water with a mixture of a compound containing at least one element selected from Group 3 to Group 14 elements of the periodic table, and the precursor (A), in the third step.

23. A zeolite substance produced by the process according to claim 1.

24. A process for producing a layered precursor for a zeolite substance, comprising the following first to third steps:

First Step:

a step of heating a mixture containing a template compound, a compound containing a Group 13 element of the periodic table, a silicon-containing compound and water to obtain a precursor (A);

Second Step:

a step of acid-treating the precursor (A) obtained in the first step;

Third Step:

a step of heating the acid-treated precursor (A) obtained in the second step together with a mixture containing a template compound and water to obtain a layered precursor.

25. A layered precursor for a zeolite substance, produced by the process according to claim 24.

* * * * *